3,598,788
PROCESS FOR THE MANUFACTURE OF
COPOLYMERS OF TRIOXANE
Karlheinz Burg, Hofheim, Taunus, Germany, assignor to
Farbwerke Hoechst Aktiengesellschaft vormals Meister
Lucius & Bruning, Frankfurt am Main, Germany
No Drawing. Filed Jan. 28, 1969, Ser. No. 794,774
Claims priority, application Germany, Feb. 1, 1968,
P 17 20 780.6
Int. Cl. C08g 1/20
U.S. Cl. 260—67                                                          6 Claims

ABSTRACT OF THE DISCLOSURE

Copolymers of trioxane are prepared by copolymerization of trioxane with cyclic acetals, linear formals, polyethylene oxides or prepolymers of polyhydric alcohols and formaldehyde in the presence of aqueous perchloric acid as cationic initiator. The products so obtained can be processed in the thermoplastic range and are used for the production of semi-manufactured and finished articles.

---

The present invention relates to a process for the manufacture of copolymers of trioxane.

It has been proposed to start the copolymerization of trioxane with the help of cationic initiators, for example protonic acids, Lewis acids and cation forming compounds. These initiators are not only different in their activity, but also in their degree of influence on termination reactions and side reactions. Organic compounds of perchloric acid, for example perchloric acid esters or mixed anhydrides of perchloric acid with organic acids, are initiators of great effectiveness. When using anhydrous perchloric acid polymers of high molecular weight are obtained in good yields even at very low concentrations of the initiator.

It is also known that the copolymerization of trioxane is advantageously carried out in the melt. It is, thereby, difficult to uniformly distribute the initiator in the monomer mixture, as the polymerization starts almost immediately, especially if highly active initiators, for example anhydrous perchloric acid, are used. The process is, therefore, carried out according to known methods in a manner such that the anhydrous perchloric acid is dissolved in a suitable solvent and the resulting solution is then used for initiating the polymerization.

The working with perchloric acid esters, with mixed anhydrides of perchloric acid and with anhydrous perchloric acid has the great disadvantage that the said initiators are highly explosive compounds and that the conditions leading to explosion are not exactly known.

The present invention provides a process for the manufacture of copolymers of trioxane by copolymerization of trioxane with (a) one or more cyclic acetals or linear formals, or with
(b) a mixture of one or more cyclic acetals or linear formals and a bis(alkanetriol)-triformal, or with
(c) a mixture of one or more cyclic acetals or linear formals and polyethylene oxide, or with
(d) a mixture of one or more cyclic acetals or linear formals and prepolymers of a molecular weight of from 176 to 2000, made from 1 mole of a 1.2 (5–11)-triol, 0 to 1 mole of an $\alpha,\omega$-diol of a molecular weight of from 62 to 1000, 0 to 1 mole of a monohydric alcohol with from 1 to 11 carbon atoms and 1 mole of formaldehyde, at temperatures within the range of the melting point and the boiling point of the monomer mixture in the presence of a cationic initiator, which comprises using as cationic initiator a solution of aqueous perchloric acid in an aliphatic or cyclic ether miscible with aqueous perchloric acid.

Like the aqueous perchloric acid the solution thereof in aliphatic or cyclic ethers are not explosive and can be used without particular precautions. Strongly diluted solutions however, must not be kept in glass vessels, as the alkali in the glass neutralizes the perchloric acid and the solution cannot be used any more for initiating the polymerization.

In the process in accordance with the invention the amount of perchloric acid, calculated on the monomers to be polymerized, is within the range of from 0.0000001 and 1 mole percent, preferably from 0.000001 to 0.0001 mole percent. The optimum amount of the initiator depends decisively on the nature and amount of the comonomers used.

As diluent for the aqueous perchloric acid there are used, either alone or in admixture with one another, aliphatic or cyclic ethers which must be mixable with aqueous perchloric acid, for example monoethylene-glycol-dimethyl ether, diethylene-glycol-dimethyl ether, 1.4-dioxane or tetrahydrofurane. 1.4-dioxane and diethylene-glycol-dimethyl ether are especially suitable. The ethers used must be of high purity, anhydrous and free from alkali.

According to the process of the invention, the ratio of aqueous perchloric acid to organic diluent, when diluting the aqueous perchloric acid with an aliphatic or cyclic ether, is within the range of from 1:100 to 1:50,000, preferably from 1:1000 to 1:10,000.

When using the initiator system in accordance with the invention, the molecular weight can be regulated with the known compounds having a transferring action, for example water or methanol. If water is used as regulator, it is possible either to add the amount of water desired to the monomer mixture, or to start from a correspondingly diluted aqueous perchloric acid and to dilute it with an aliphatic or cyclic ether to obtain the concentration desired.

Depending on the desired regulating effect, the concentration of the aqueous perchloric acid may be within the range of from 1 to 70, preferably from 20 to 70% by weight. Particularly good results are obtained with an aqueous perchloric acid having a concentration within the range of from 50 to 70% by weight. The upper limit of 70% by weight is determined by the commercial perchloric acid having the said concentration.

When using aqueous solutions of perchloric acid without dilution with an aliphatic or cyclic ether as initiator, it is not only difficult to introduce very small amounts of initiator solution, but also, as already mentioned above for the initiation with anhydrous perchloric acid, to obtain a uniform distribution of the initiator in the monomer mixture before polymerization starts. The initiator is included in clots so that the residual monomer cannot polymerize.

Depending on the amount of the initiator and regulator used, the copolymers of trioxane obtained by the process in accordance with the invention have a molecular weight within the range of from 10,000 to 100,000. As compared to the initiation with Lewis acids, for example boron trifluoride or boron trifluoride etherate, the polymerization with aqueous perchloric acid in aliphatic or cyclic ethers as initiator results in products of higher molecular weight.

The co-components used in accordance with the invention are used in amounts of (a) From 0.01 to 60, preferably from 10 to 50% by weight of one or more cyclic acetals or linear formals, calculated on the total mixture, or (b) From 0.1 to 60, preferably from 10 to 50% by weight of one or more cyclic acetals or linear formals and from 0.05 to 5, preferably 0.1 to 1% by weight of a bis(alkane-triol)-triformal, respectively calculated on the total mixture, or (c) From 0.1 to 60, preferably from 10 to 50% by weight of one or more cyclic acetals or linear formals, and from 0.1 to 30, preferably from 1 to 10% by weight of a polyethylene oxide, respectively calculated on the total mixture, or (d) From 0.1 to 60, preferably from 10 to 50% by weight of a prepolymer of a molecular weight of from 176 to 2000, obtained from 1 mole of a 1.2.(5-11)-triol, 0 to 1 mole of a $\alpha,\omega$-dial of a molecular weight of from 62 to 1000, 0 to 1 mole of a monohydric alcohol with from 1 to 11 carbon atoms and 1 mole of formaldehyde.

As comonomers for trioxane there are advantageously used cyclic acetals of the formula (I)

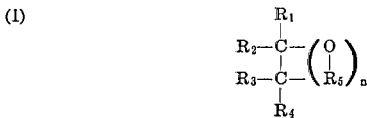

in which the radicals $R_1$, $R_2$, $R_3$ and $R_4$ are identical or different and stand for hydrogen atoms or alkyl groups or halogen-substituted alkyl groups and $R_5$ stands for an oxymethylene group, an oxymethylene group substituted by alkyl or halo-alkyl, $n$ being a whole number from 1 to 3, or $R_5$ stands for the group

$n$ being 1 and $m$ being a whole number from 1 to 3. The above alkyl groups contain from 1 to 5, preferably 1 or 2 carbon atoms and may be substituted by 1 to 3 halogen atoms, preferably by chlorine atoms.

Especially suitable are cyclic formals with from 5 to 8 ring members, for example glycol formal and diglycol formal as well as 4-chloromethyl-dioxolane.

In the process in accordance with the invention linear formals of $\alpha,\omega$-diols, preferably those having from 4 to 6 carbon atoms, may also be used as comonomers for trioxane, for example 1,4-butane-diol-formal, 1,4-butene-(2)-diol-formal and 1,6-hexane-diol-formal.

The initiator system of the invention is also suitable for the preparation of terpolymers of trioxane. In addition to the cyclic and linear acetals mentioned as comonomers, bis(alkanetriol)-triformals, which improve in known manner the flowability of the product obtained, may be used as tercomponents. There are used bis(alkanetriol)-triformals of the formula (II)

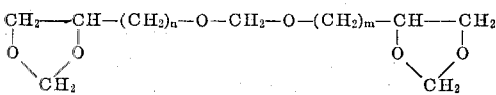

in which $n$ and $m$ are whole numbers from 3 to 9, preferably 3 or 4. Especially suitable are compounds which contain a linear and two cyclic formal groups, for example bis(1,2,5-pentanetriol)-triformal and preferably bis(1,2,6-hexanetriol)-triformal.

Further suitable tercomponents are prepolymers of a molecular weight of from 176 to 2000, which have been obtained from 1 mole of a 1,2(5-11)-triol, 0 to 1 mole of a $\alpha,\omega$-diol of a molecular weight of from 62 to 1000, 0 to 1 mole of a monohydric alcohol with from 1 to 11 carbon atoms and 1 mole of formaldehyde.

Finally, in addition to the said comonomers there may also be used as tercomponents polyethylene oxides with terminal hydroxyl groups of a molecular weight within the range of from 300 to 50,000. There are preferably used polyethylene oxides of a molecular weight within the range of from 2000 to 25,000, the best results being obtained using polyethylene oxides with molecular weights within the range of from 4000 to 10,000.

The polymerization in the melt is preferably carried out within the range of the melting point of the monomer mixture and the boiling point of the comonomer having the lowest boiling point. Very good results are obtained at temperatures within the range of from 50 to 70° C.

The polymerization is carried out in a manner such that the solution of the aqueous perchloric acid in an aliphatic or cyclic ether is added to the monomer mixture and the whole is then mixed thoroughly. Depending on the nature and the amount of the comonomers used, the amount of catalyst is chosen in a manner such that the polymerization heat liberated can still be eliminated without difficulty.

After the polymerization the polymer block is ground for working up and then hydrolyzed in known manner at elevated temperature in an alkaline medium. The hydrolysis may be carried out, for example, at 150° C. in benzyl alcohol in the presence of triethanolamine.

The products obtained by the process in accordance with the invention can be processed in the thermoplastic range by injection-molding, extrusion or deep drawing. They are suitable for the manufacture of semi-manufactured and finished articles, for example plates, sheets, films, ribbons or shells.

The following examples serve to illustrate the invention, but are not intended to limit it:

EXAMPLE 1

0.2 ml. of a solution of 1 part by volume of an aqueous perchloric acid of 70% strength in 10,000 parts by volume of 1.4-dioxane was added at 70° C. to a mixture of 90 grams of trioxane and 10 grams of 1.3-dioxolane while excluding atmospheric moisture and oxygen and the whole was mixed thoroughly. After 30 seconds the reaction mixture had polymerized to a solid mass. It was maintained at the said temperature for 30 minutes and then cooled in ice water. The polymer block so obtained was ground and dissolved at 150° C. in 1 liter of benzyl alcohol which contained 3% by weight of triethanolamine. After stirring at this temperature for 30 minutes, the solution was cooled to 90° C. and methanol was added. After cooling and boiling three times with methanol a product was obtained which had the properties shown in the following table.

TABLE

| Example No. | Monomer mixture, percent | Amount of initiator [1] HClO₄ | H₂O | Concentration of aqueous perchloric acid, percent | Diluent | Yield, percent | RSV-value of copolymer [2] | Melting point, °C. |
|---|---|---|---|---|---|---|---|---|
| 1 | 90 TO / 10 DO | 0.23 | 0.56 | 70 | 1.4-dioxane | 95 | 1.62 | 156 |
| 2 | 90 TO / 10 DO | 0.50 | 2.78 | 1 | ….do…. | 92 | 0.76 | 156 |
| 3 | 90 TO / 10 DO | 0.23 | 0.56 | 70 | Glycol-dimethyl ether | 93 | 1.49 | 156 |
| 4 | 70 TO / 30 DO | 0.35 | 0.83 | 70 | 1.4-dioxane | 87 | 1.17 | 141 |
| 5 | 55 TO / 35 DO / 5 BDF / 5 HDF | 2.92 | 6.95 | 70 | ….do…. | 90 | 0.75 | 70 |
| 6 | 80 TO / 20 DO | 5.84 | 13.90 | 70 | ….do…. | 85 | 0.36 | 150 |
| 7 | 70 TO / 20 DO / 10 PDF | 1.17 | 2.78 | 70 | ….do…. | 82 | 0.56 | 135 |
| 8 | 75 TO / 20 PEO 10,000 / 5 DO | 465 | 1,110 | 70 | ….do…. | 80 | 0.32 | 161 |

[1] 10⁻³ millimole per 100 g. of monomer mixture.
[2] Reduced specific viscosity, measured in butyrolactone at 140° C. in a concentration of 0.5 g./100 ml.
Abbreviations: TO=trioxane; DO=1.3-dioxolane; BDF=1.4-butanediolformal; HDF=1.6-hexanediolformal; PDF=1.2-propanediolformal; PEO 10,000=polyethylene oxide of a molecular weight of 10,000.

Examples 2 to 7 were carried out in a manner analogous to Example 1.

I claim:

1. In a process for making copolymers of trioxane by copolymerization of trioxane with a comonomer or comonomers selected from (a) at least one cyclic acetal or linear formal, (b) a mixture of at least one cyclic acetal or linear formal and a bis(alkanetriol)-triformal, (c) a mixture of at least one cyclic acetal or linear formal and polyethylene oxide, and (d) a mixture of at least one cyclic acetal or linear formal and a prepolymer of a molecular weight of from 176 to 2000, which has been obtained from 1 mole of a 1,2-(5-11)-triol, 0 to 1 mole of an alpha, omega-diol of a molecular weight of from 62 to 100, 0 to 1 mole of a monohydric alcohol with from 1 to 11 carbon atoms and 1 mole of formaldehyde, at a temperature within the range of the melting point and boiling point of the monomer mixture in the presence of a cationic initiator, the improvement which comprises using as a cationic initiator a solution of 1% to 70% aqueous perchloric acid in an aliphatic or cyclic ether miscible with aqueous perchloric acid wherein the ratio of aqueous perchloric acid to said ether in the initiator is in the range of 1:100 to 1:50,000.

2. A process according to claim 1 wherein the ratio of aqueous perchloric acid to aliphatic or cyclic ether in the initiator is in the range 1:1,000 to 1:10,000.

3. A process according to claim 1 wherein the aqueous perchloric acid is dissolved in the dimethyl ether of ethylene glycol.

4. A process according to claim 1 wherein the aqueous perchloric acid is dissolved in the dimethyl ether of diethylene glycol.

5. A process according to claim 1 wherein the aqueous perchloric acid is dissolved in 1,4-dioxane.

6. A process according to claim 1 wherein the aqueous perchloric acid is dissolved in tetrahydrofurane.

References Cited

UNITED STATES PATENTS

| | | | |
|---|---|---|---|
| 3,122,525 | 2/1964 | Kern et al. | 260—67 |
| 3,183,212 | 5/1965 | Hopff et al. | 260—67 |
| 3,418,279 | 12/1968 | Baumber | 260—67 |
| 3,457,228 | 7/1969 | Fischer et al. | 260—67 |
| 3,457,229 | 7/1969 | Fischer et al. | 260—67 |

WILLIAM H. SHORT, Primary Examiner

L. M. PHYNES, Assistant Examiner

U.S. Cl. X.R.

260—823